United States Patent [19]

Haider et al.

[11] Patent Number: 5,154,476
[45] Date of Patent: Oct. 13, 1992

[54] LOCKING SEAT RECLINER

[75] Inventors: Syed Haider, Ypsilanti; Rui-Ning Wu, Westland; Dave Matejka, Canton; Timothy S. Myers, Northville, all of Mich.

[73] Assignee: Hoover Universal, Inc., Plymouth, Mich.

[21] Appl. No.: 658,759

[22] Filed: Feb. 21, 1991

[51] Int. Cl.⁵ .............................................. B60N 2/02
[52] U.S. Cl. ..................................... 297/367; 297/379
[58] Field of Search ................................ 297/367, 379

[56] References Cited

U.S. PATENT DOCUMENTS

| 4,146,267 | 3/1979 | Mori et al. | 297/367 |
| 4,836,608 | 6/1989 | Sugiyama | 297/379 X |
| 4,913,494 | 4/1990 | Ikegaya | 297/367 |

Primary Examiner—Kenneth J. Dorner
Assistant Examiner—Milton Nelson, Jr.
Attorney, Agent, or Firm—Harness, Dickey & Pierce

[57] ABSTRACT

An improved recliner for a seat assembly is shown of the type having a pawl engagable with a sector gear having a cam engagable with the pawl to hold the pawl in a locked position. The recliner provides a curved camming surface on the pawl having a substantially constant locking angle relative to the pawl to ensure that the friction force available between the cam and pawl is sufficient to prevent back driving of the recliner by forces applied to the seat back. In addition, the cam contacting surface is profiled to ensure a quick release of the recliner and the cam, once released from the pawl camming surface, contacts a release surface of the pawl to positively rotate the pawl from engagement with the sector gear. The cam is rotated by an operating lever coupled to the cam by a lost rotational motion coupling enabling the operating lever to have a fixed rest position relative to the seat cushion regardless of the rest locked position of the cam.

11 Claims, 2 Drawing Sheets

LOCKING SEAT RECLINER

BACKGROUND AND SUMMARY OF THE INVENTION

This invention relates to seat recliners of the type having a rotatable pawl engagable with a sector gear and a cam for holding the pawl in locking engagement with the sector gear. In particular, the present invention provides improved to the seat back.

Numerous recliner mechanisms have been developed for adjusting the angle of a seat back. One type of mechanism includes a sector gear, attached to the seat back, consisting of a plate with a tooth portion along one edge. The tooth portion is curved with a center of curvature at the rotational axis of the seat back. A locking pawl is mounted to a side plate which in turn is attached to the lower seat cushion and has a corresponding arcuate toothed portion. The pawl is rotatable into and out of engagement with the teeth of the sector gear so as to lock and unlock the seat back. A cam, also rotatably mounted to the side plate attached to the seat cushion, engages a camming surface of the pawl to hold the pawl in position engaged with the sector gear to latch the seat back in place. Typically, the cam is biased into a locking position to keep the seat back locked. To adjust the seat back angle, an operating lever is provided to rotate the cam to a release position enabling the pawl to disengage from the sector gear to enable rotation of the seat back.

In some recliners the camming surface may include a cam and the pawl produces sufficient friction to lock the cam in place. However, if the cam engages the camming surface ,; outside of the locking zone the friction between the cam and pawl is not sufficient to prevent sliding of the cam across the camming surface. In other words, the cam and pawl have a limited range of positions at which the cam and pawl will engage to lock the pawl with the sector gear.

One reason for making a limited range of locking positions is so the release lever, which is coupled to the cam, can have a rest position within a narrow tolerance range specified by the seat customer. However, due to tolerance variations in the cam, pawl and sector gear and the tolerance in the location of the various pivot points, the cam and pawl may not engage at the locking zone with the pawl teeth fully engaged with the sector gear teeth. When contact occurs outside of the locking zone, there may be insufficient friction to hold the cam in place. Forces applied to the seat back may "back-drive" the cam, causing the cam to slip off the pawl camming surface, releasing the pawl and seat back.

Accordingly, it is an object of the present invention to provide a recliner with an enlarged locking zone, giving the recliner a wider tolerance range for the positions of the cam and pawl to lock the seat back in place.

It is a further object of the present invention to provide means for controlling the position of the release handle at rest regardless of the cam position.

It is another object of the invention to provide a quick release recliner that positively disengages the pawl from the sector gear rather than relying solely on gravity to drop the pawl.

The recliner of the present invention includes a base plate attached to the lower seat cushion, an arm mounted to the seat back and pivotally coupled to the base plate for rotation of the arm and seat back relative to the base plate, a sector gear attached to the arm, a pawl rotatably mounted to the base plate engagable with the teeth of the sector gear to lock the arm in place, a cam rotatably mounted to the base plate and engagable with a camming surface of the pawl to hold the pawl in engagement with the sector gear and an operating lever to move the cam to a release position to disengage the pawl from the sector gear. The entire camming surface of the pawl is a locking zone such that the cam and pawl will lock regardless of where the cam contacts the pawl. This is accomplished by forming the camming surface with a constant radius arc so that the locking angle between the cam and pawl is substantially constant over the entire camming surface. This ensures locking engagement between the cam and pawl with the pawl teeth fully engaged with the sector gear teeth.

The release lever is coupled to the cam through a slotted coupling enabling initial rotation of the lever before the cam begins to move. This allows the release lever to have a predefined rest position relative to the base plate regardless of the cam rest position.

The cam is profiled to clear the pawl quickly once the cam as disengaged from the pawl. To ensure positive release of the pawl, the cam, once it has cleared the camming surface, engages a release portion of the pawl to rotate the pawl out of contact with the sector gear.

Further objects, features and advantages of the invention will become apparent from a consideration of the following description and the appended claims when taken in connection with the accompanying drawings.

DETAILED DESCRIPTION OF THE INVENTION

Figure 1:
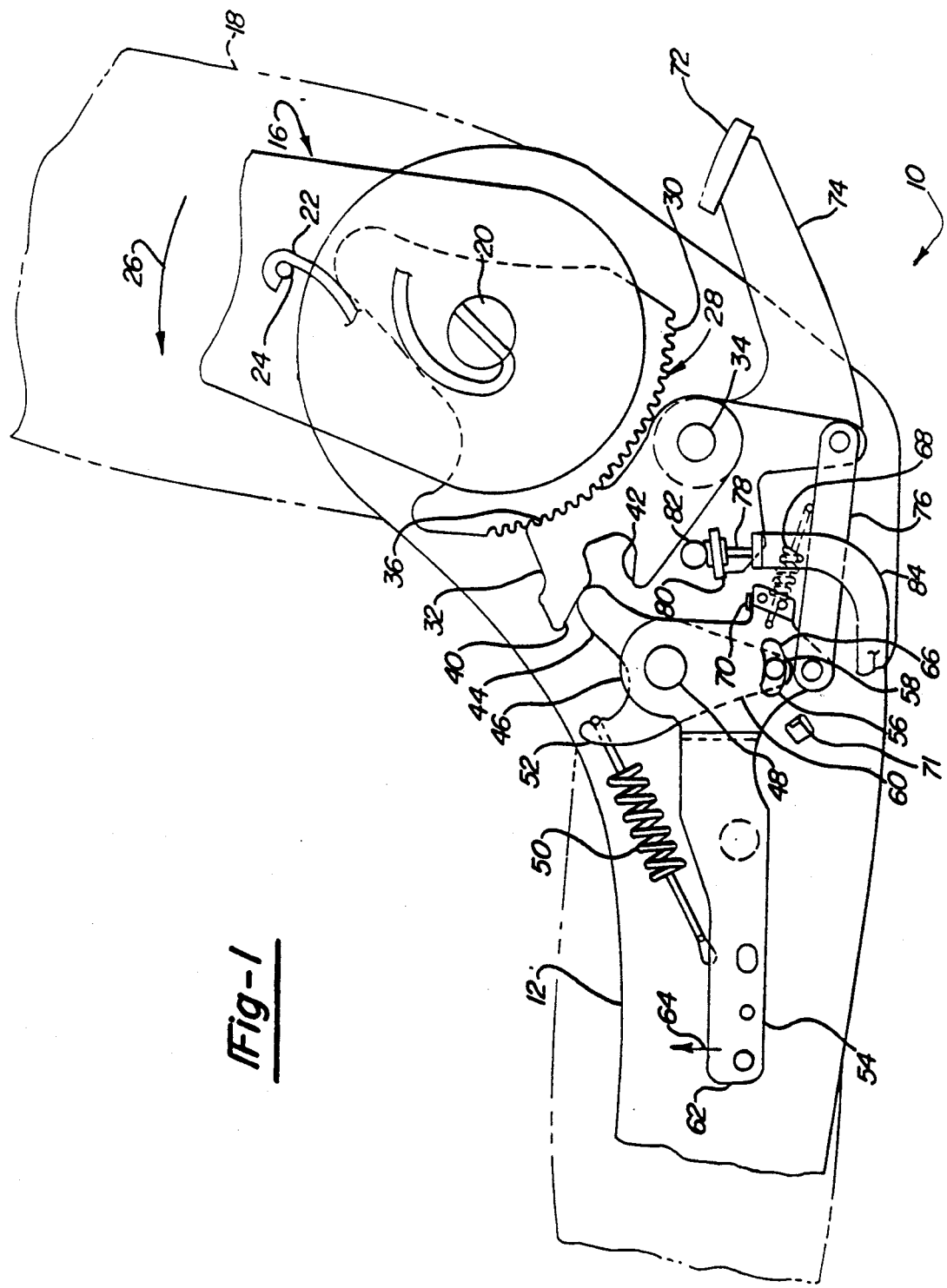
FIG. 1 is a side elevational view of the recliner of the present invention.

The recliner of the present invention is shown in FIG. 1 and designated generally as 10. Recliner 10 includes a base plate 12 coupled to the lower seat cushion 14 of a seat assembly. An arm 16 is pivotally coupled to the base plate 12 for rotation about the shaft 20. Seat back 18 is attached to the arm 16. A spiral spring 22 engaged with the shaft 20 and pin 24 on the arm 16 biases the seat back forward in the direction of arrow 26 when the recliner is disengaged as described below.

A sector gear 28 is fixed to the arm 16 and includes upper teeth 30 in an arcuate path having a center at shaft 20. A pawl 32 is pivotally mounted to the base plate about pivot 34 and includes arcuate lower teeth 36 engagable with the upper teeth 30 of sector 28. When the lower teeth 36 are engaged with upper teeth 30, the arm 16 is locked in place. When the lower teeth 36 are disengaged from upper teeth 30, the arm 16 is released and free to rotate about shaft 20. Pawl 32 has a recess portion 38 formed in an edge opposite from the lower teeth 36. The recess portion 38 is formed in part by a camming surface 40 and a release surface 42 opposite the recess portion 38 from camming surface 40. Camming surface 40 is arcuate, having a constant radius of curvature and forms a locking zone for locking contact with a cam 46.

A leg 44 of cam 46 is engagable with the camming surface 40 to hold the pawl 32 in the locked position in which the lower teeth 36 are engaged with the upper teeth 30. Cam 46 is mounted to the base plate 12 for rotation about pivot 48. Cam 46 is biased in a counterclockwise direction as viewed in FIG. 1 by spring 50, one end of which is connected to leg 52 of cam 46 while the other end is coupled to the base plate 12. The cam leg 44 will slide along the camming surface to a locked position in which the friction forces acting on the cam are location along the surface 40. This point of contact slides across the camming surface as the pawl is rotated into and out of engagement with the upper teeth. The location of the contact point along the camming surface when the cam is in the locked position will vary with the manufacturing variation of the various components.

The recliner is released by clockwise rotation of the cam such that leg 44 is disengaged from the camming surface 40 and is directed into the recess portion 38, thus enabling rotation of the pawl 32 in a direction disengaging the lower teeth from the upper teeth. Once the pawl is disengaged from the sector gear, the seat back will rotate forward by the action of bias spring 22. The seat occupant can lean against the seat back to move it in opposition to the bias spring to a desired position before re-engaging the pawl to a locked position.

Operating lever 54 is provided to rotate the cam 46 to release the pawl 32. Operating lever 54 is mounted to the base plate 12 for rotation about pivot 48. An arcuate slot 56 is provided in the operating lever concentric about the pivot 48. A pin 58 extending from leg 60 of the cam 46 extends through the slot 56 creating a lost rotational motion coupling between the lever 54 and cam 46. Clockwise rotation of the lever 54 by raising end 62 in the direction of arrow 64, will result in the end 66 of slot 56 contacting the pin 58. Continued rotation of the lever will rotate cam 46 clockwise in opposition to spring 48. A handle (not shown) can be attached to the end 62 of lever 54 for griping by a seat occupant.

Spring 68, with one end connected to lever 54 and the other end connected to base plate 12, biases the lever 54 against stop 70 on base plate 12 to precisely position the lever 54 at rest. The lost rotational motion coupling of the lever and cam enables the lever to be located at a predetermined rest position relative to the base plate 12 regardless of the locked position of cam 46. A second stop 71 on the base plate limits the extent of rotation of lever 54.

When the seat assembly is used as a front seat in a two-door motor vehicle, a foot pedal 72 is provided to the rear of the seat assembly to enable operation of the recliner by a vehicle occupant seated behind the seat assembly. This enables a rear seat occupant to rotate the seat back forward to a dump position to improve the access to the area behind the seat. Foot pedal 72 is part of pedal lever 74 rotatably mounted to the base plate about pivot 34. A link 76 couples the pedal lever 74 to operating lever 54 such that downward depression of pedal 72 results in an upward rotation of the operating lever 54, releasing the cam as described above.

A wire cable 78 is attached to tab 80 of lever 74 with a ball 82. Cable 78 is slidable through a housing 84 and is used to couple the recliner 10 with a similar slave recliner on the opposite side of the seat assembly. Operation of recliner 10 through lever 54 simultaneously and remotely operates the slave recliner at the opposite side of the seat assembly through the cable 78. Cable 78 can be attached to the lever 54 in the event that a foot pedal 72 is not needed.

Figure 2:
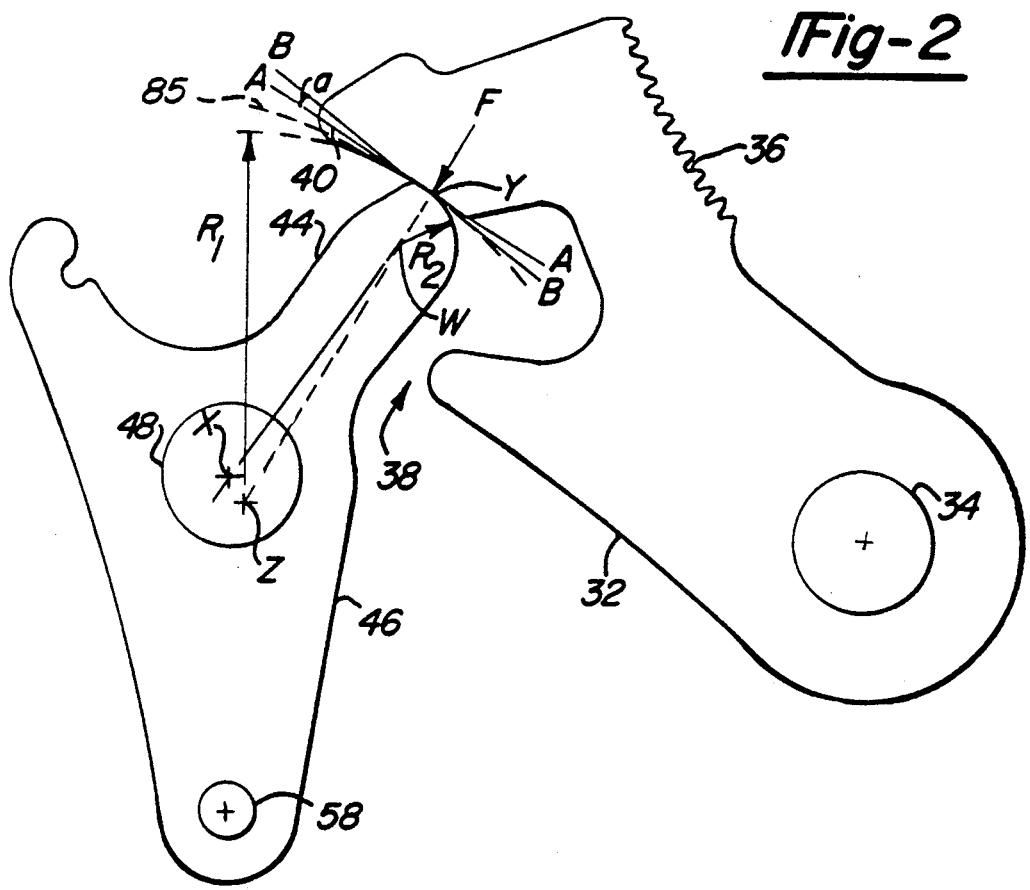
FIG. 2 is an enlarged elevational view of the cam and pawl in a locked position.

The engagement of the cam 46 with pawl 32 is shown in greater detail in FIG. 2. The camming surface 40 of pawl 32 is an arc having a constant radius $R_1$ concentric about point Z.

The end of leg 44 of the cam 46 is a curved surface having a radius $R_2$ concentric about point "W" positioned near the end of leg 44 such that $R_2$ is considerably smaller than $R_1$. The cam 46 contacts the camming surface 40 at point Y and rotates about the center of pivot 48 at point X. Point Z, the center of curvature of the camming surface is offset from point X, so that the path of travel of contact point Y does not follow the surface 40 but rather follows the curved path shown by broken arcuate line 85 intersecting with surface 40. As shown in FIG. 2, The point Y recedes from camming surface 40 upon rotation of the cam to a release position.

The locking angle between the cam and pawl is the angle "a" between line A—A and line B—B. Line B—B is tangent to the curved path 85 at point Y while line A—A is tangent to the camming surface 40 at point Y.

A force applied to the seat back acts through the sector teeth and pawl teeth to move the pawl out of engagement with the sector gear. This creates a backdrive force F acting on the cam. To prevent backdriving of the cam by force F, the component of force F applied to the cam in the direction of line B—B must not exceed the maximum friction force acting in the opposite direction on the cam 46. Force F is perpendicular line B—B, force $F_b$ is equal to Fsin a. The friction force, force $F_f$ which must resist force $F_b$ is equal to uFcos a. As a result, to prevent the backdrive force from rotating cam 46, the coefficient of friction "u" must be greater than or equal to the tangent of angle "a". For steel, with a coefficient of friction of 0.1, the locking angle "a" should not exceed approximately 6°. By forming the camming surface with a constant radius curve, the angle "a" between the cam and pawl is substantially constant regardless of where the cam contacts surface 40. This results in the entire surface 40 functioning as a locking zone to prevent backdriving of the recliner.

The camming surface 40 is shown in this embodiment as being a concave surface. This is due to the location of the pivot point X relative to the pawl and camming surface. If the pivot point X were placed above the pawl, with a cam leg extending around the pawl to contact the surface 40, the camming surface, since its center of curvature is located near point X, would now be a convex surface rather than concave. Either configuration is contemplated by the present invention and appended claims.

Figure 3:
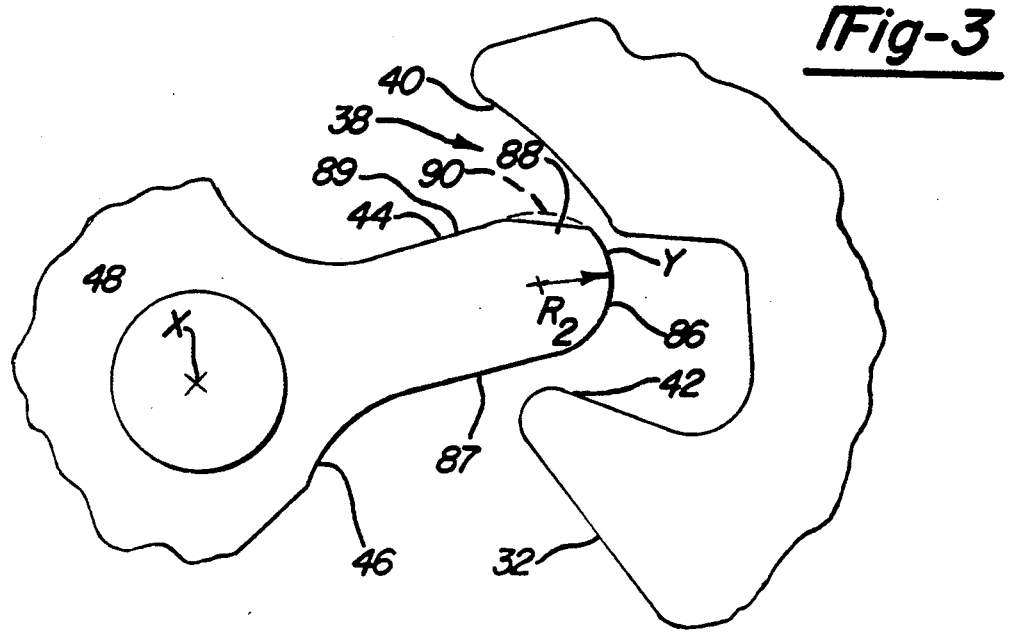
FIG. 3 is a enlarged fragmentary elevational view of the cam and pawl in an initial release position.

With reference to FIG. 3, the cam and pawl are shown in an initial release position. The end of cam leg 44 is profiled so as to have a curved contacting portion 86 containing the contact point Y and a cut off or flattened section 88. The curved contacting portion 86 forms a continuation of the leading side edge 87 of leg 44. However, rather than continuing the curved contacting portion to the trailing side edge 89 of leg 44, the curved portion is cut off forming the flattened section 88 on the trailing side of the cam tip.

The cut off 88 enables a quick release of the pawl. Shortly after the contact point Y has cleared the end of surface 40, the entire cam is clear of the surface 40, enabling rotation of the pawl to a release position. A continuation of the curved contacting surface 86 is shown by the broken line 90. If the cam surface was not cut off, additional rotation of the cam would be needed to clear the pawl camming surface even after contact point y is disengaged from the pawl. Thus, a quick release of the pawl is enabled. The terms "leading" and "trailing" as used to describe the cam leg 44 refer to the orientation of the edges as the cam rotates from the locked position to the release position.

Once the cam has cleared the pawl surface 40, continued rotation of the pawl 46 results in contact of the cam leg 44 with the release surface 42 of the pawl on the opposite side of recess 38. This contact with the cam forces the pawl 32 to rotate out of engagement with the sector gear by a positive force rather than relying solely on gravity.

The cut out 88 and the cam contact with release surface 42 helps to ensure precise release of the pawl 32. This is beneficial in synchronizing the pawl release of recliner 10 with the release of the slave recliner on the opposite side of a seat assembly.

It can be seen that the recliner 10 provides cam and pawl is maintained at a desired angle to ensure positive locking of the pawl and to prevent backdriving of the recliner regardless of the position of the cam. The lost rotational motion coupling of the operating lever and cam enables the operating lever to be precisely positioned relative to the seat cushion. This is a desirable feature to provide uniformity in the handle position among numerous seat assemblies. The profiled cam surface, having a cut out 88 and the release surface 42 on the pawl provides positive and quick releasing of the pawl.

It is to be understood that the invention is not limited to the exact construction illustrated and described above, but that various changes and modifications may be made without departing from the spirit and scope of the invention as defined in the following claims.

We claim:

1. In a seat assembly having a lower seat cushion and a generally upright seat back pivotally mounted at the rear of said seat back, a recliner comprising:
    base plate means fixed to said seat cushion;
    arm means fixed to said seat back and pivotally mounted said plate means for rotation about a fixed axis;
    sector gear means fixed to said arm means having an upper teeth means;
    pawl means pivotally mounted to said base plate means about a second axis and having a lower teeth means engagable with and disengagable from said upper teeth means to lock and unlock said arm means relative to said base plate means, said pawl means having an arcuate camming surface in an edge opposite said lower teeth means having a constant radius of curvature;
    cam means pivotally mounted to said base plate means about a third axis and having a curved contacting surface portion for contact with said camming surface of said pawl means at a single location defining a contact point along said camming surface in a locked position to hold said pawl means in an engaged position in which said lower teeth means engage said upper teeth means to lock said arm means in place, said third axis being located relative to the center of curvature of said camming surface when said pawl means is in said engaged position so that a line tangent to the path of rotation of said cam means at said contact point is inclined at a locking angle A to a line tangent to said camming surface at said contact point, the tangent of said locking angle A being less than or equal to the coefficient to friction between the cam means and the pawl means;
    first bias means coupled to said cam means for holding said cam means in contact with said camming surface; and
    operating lever means coupled to said cam means for rotating said cam means from said locked position in contact with said camming surface to a release position disengaged from said camming surface upon rotation of said operating lever means from a rest position.

2. The recliner of claim 1 wherein the cam means and pawl means are formed of steel and the locking angle A between said cam means path of rotation and said camming surface is less than about 6°.

3. The recliner of claim 1 further comprising means for holding said operating lever means in a predetermined rest position relative to said base plate means regardless of the locked position of said cam means including:
    stop means mounted to said base plate means and engagable with said operating lever means;
    second bias means for rotating said lever means into engagement with said stop means; and
    lost rotational motion coupling means between said lever means and said cam means for permitting initial rotation of said lever means before rotation of said cam means.

4. The recliner of claim 3 wherein the locking angle A between said cam means path of rotation and said camming surface is substantially constant for contact at any location across said camming surface.

5. The recliner of claim 3 wherein said cam means includes a leg extending radially from said third axis toward said camming surface, said leg having a leading edge and a trailing edge as said cam means rotates from said locked position to a release position, said leg having a profiled end consisting of said curved contacting surface portion extending from said leading edge of said leg and a flattened cut off portion between said contacting surface portion and said trailing edge, said contacting surface portion contacting said camming surface when said cam means is in said locked position.

6. The recliner of claim 5 wherein the leading edge of said cam leg, during rotation of said cam means to said release position contacts a release surface of said pawl means to rotate said pawl means away from said upper teeth after said contacting surface portion clears said camming surface.

7. The recliner of claim 6 further comprising wire means for remote operation of a slave recliner.

8. The recliner of claim 6 wherein said operating lever means rotates about said third axis.

9. The recliner of claim 8 further comprising a pedal extending rearward of said seat assembly and coupled to said operating lever means to operate said recliner from behind said seat assembly.

10. In a seat assembly having a lower seat cushion and a generally upright seat back pivotally mounted at the rear of said seat cushion, a recliner comprising:
    base plate means fixed to said seat cushion;
    arm means fixed to said seat back and pivotally mounted to said base plate mean for rotation about a first axis;
    sector gear means fixed to said arm means having an upper teeth means;
    pawl means pivotally mounted to said base plate means about a second axis and having a lower teeth means engagable with and disengagable from said upper teeth means to lock and unlock said arm means relative to said plate means, said pawl means having a recess formed in an edge opposite said lower teeth means and an arcuate camming surface along a side edge portion of said recess having a constant radius of curvature;

cam means pivotally mounted to said base plate means about a third axis and having a curved contacting surface portion for contact with said camming surface of said pawl means at a single location defining a contact point along said camming surface in a locked position to hold said pawl means in an engaged position in which said lower teeth means engage said upper teeth means to lock said arm means in place, said third axis being located relative to the center of curvature of said camming surface when said pawl means is in said engaged position so that a line tangent to the path of rotation of said cam means at said contact point is inclined at a locking angle A to a line tangent to said camming surface at said contact point, the tangent of said locking angle A being less than or equal to the coefficient of friction between the cam means and the pawl means, said locking angle A being substantially constant for contact at any location across said camming surface;

first bias means coupled to said cam means for holding said cam means in contact with said camming surface;

operating lever means pivotally mounted to said base plate means and coupled to said cam means for rotating said cam means from said locked position in contact with said camming surface to a release position disengaged from said camming surface upon rotation of said operating lever means from a rest position;

means for holding said operating lever means in a predetermined rest position relative to said base plate means regardless of the locked position of said cam means, said holding means including stop means mounted to said plate means and engagable with said operating lever means, second bias means for rotating said lever means into engagement with said stop means, and lost rotational motion coupling means between said lever means and said cam means for permitting initial rotation of said lever means before rotation of said cam means; and said cam means including a leg extending radially from said third axis toward said camming surface, said leg having a leading edge and a trailing edge as said cam means rotates from said locked position to a release position, said leg having a profiled end consisting of said curved contacting surface portion extending from said leading edge of said leg and a flattened cut off portion between said contacting surface portion and said trailing edge, said contacting surface portion contacting said camming surface when said cam means is in said locked position, said leading edge of said cam leg during rotation of said cam means to said release position contacting a release surface of said pawl means to rotate said pawl means away from said upper teeth after said contacting surface has cleared said camming surface.

11. The recliner of claim 10 wherein the cam means and pawl means are formed of steel and the locking angle A between said cam means and said camming surface does not exceed about 6°.

* * * * *

UNITED STATES PATENT AND TRADEMARK OFFICE
CERTIFICATE OF CORRECTION

PATENT NO. : 5,154,476

DATED : October 13, 1992

INVENTOR(S) : Syed Haider, Rui-Ning Wu, Dave Matejka, Timothy S. Myers

It is certified that error appears in the above-identified patent and that said Letters Patent is hereby corrected as shown below:

Column 1, line 10, after "improved", insert --means for preventing release of the recliner by loads applied--.

Column 1, line 30, after "include a", insert --relatively small locking zone in which the angle between the--.

Column 3, line 8, after "are", insert --sufficient to stop sliding motion of the cam across the camming surface. The cam contacts the camming surface at a single--.

Column 4, line 26, after "perpendicular", insert --to line A-A such that the components of Force F acting along--.

Column 5, line 16, after "provides", insert --advantages over the prior art. The locking angle between the--.

Column 5, Claim 1, line 39, after "mounted", insert --to -- after mounted--.

UNITED STATES PATENT AND TRADEMARK OFFICE
CERTIFICATE OF CORRECTION

PATENT NO. : 5,154,476
DATED : October 13, 1992
INVENTOR(S) : Syed Haider, et. al.

It is certified that error appears in the above-indentified patent and that said Letters Patent is hereby corrected as shown below:

Column 6, Claim 10, line 61, after "base plate", delete "mean" and insert-- means--.

Signed and Sealed this

Ninth Day of November, 1993

Attest:

BRUCE LEHMAN

Attesting Officer      Commissioner of Patents and Trademarks